United States Patent [19]
Andersson et al.

[11] 3,888,967
[45] June 10, 1975

[54] METHOD AND APPARATUS FOR OXIDIZING SULPHIDE-CONTAINING AQUEOUS SOLUTIONS

[75] Inventors: Per-Erik Andersson; Einar Horntvedt, both of Sundsvall, Sweden

[73] Assignee: Svenska Cellulosa Aktiebolaget, Sundsvall, Sweden

[22] Filed: Feb. 9, 1973

[21] Appl. No.: 331,298

[30] Foreign Application Priority Data
Mar. 8, 1972  Sweden.............................. 2936/72

[52] U.S. Cl.................. 423/206; 423/182; 423/514
[51] Int. Cl............................................. C01b 17/64
[58] Field of Search ........... 423/544, 514, 567, 204, 423/206, 182

[56] References Cited
UNITED STATES PATENTS

| | | | |
|---|---|---|---|
| 2,642,336 | 6/1953 | Greenwalt........................... | 423/204 |
| 2,726,927 | 12/1955 | Bergstrom........................... | 423/204 |
| 3,637,352 | 1/1972 | Bratzler et al. ..................... | 423/567 |
| 3,752,875 | 8/1973 | O'Hern, Jr. et al.................. | 423/514 |

FOREIGN PATENTS OR APPLICATIONS

| 174,653 | 2/1922 | United Kingdom................. | 423/514 |

*Primary Examiner*—Oscar R. Vertiz
*Assistant Examiner*—Gary P. Straub
*Attorney, Agent, or Firm*—Pierce, Scheffler & Parker

[57] ABSTRACT

In oxidizing sulphides contained in alkaline aqueous solutions by an oxygen-containing gas, the unwanted production of hydrogen sulphide is prevented by effecting the oxidation in the presence of finely divided active carbon and with vigorous stirring.

1 Claim, 1 Drawing Figure

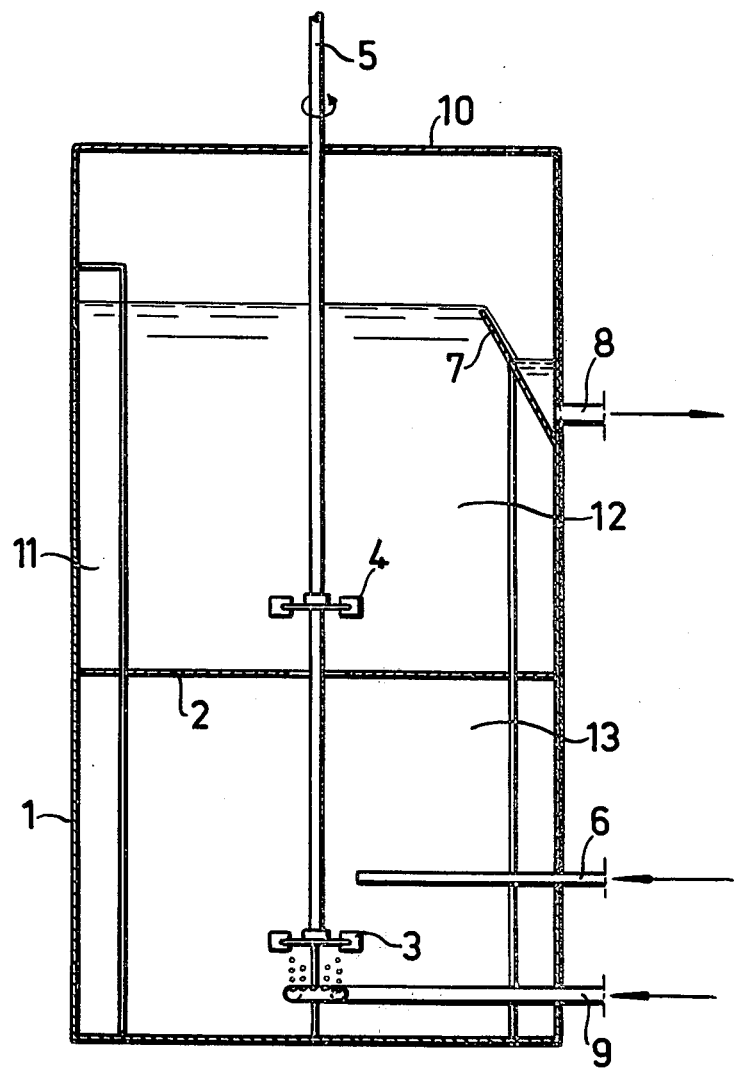

METHOD AND APPARATUS FOR OXIDIZING SULPHIDE-CONTAINING AQUEOUS SOLUTIONS

This invention relates to a method and an apparatus for oxidizing sulphide in alkaline sulphide-containing aqueous solutions or suspensions by an oxygen-containing gas, in such a manner, that the sulphide sulphur is converted into nonvolatile sulphur compounds such as thiosulphate and/or sulphate or sulphur.

At the experimental work, which was carried out to solve the basic problem of the invention, i.e., to prevent the development of hydrogen sulphide in waste gases from certain factories where sulphides occur in aqueous solutions, it was observed that the oxidation rate at oxidation by air in pure solutions was very low and that for the oxidation very large amounts of air were required, i.e. the degree of utilization of the air supplied was very low.

In conjunction with these operations it was found by surprise that the oxidation rate is increased distinctly and at the same time the utilization degree of the supplied air increases, when active carbon is added to the alkaline solution.

This surprising discovery can be applied directly in a recovery process for the recovery of sodium and sulphur from waste liquors of the digesting of cellulose pulp according to the sulphite process.

The recovery process here referred to is the subject matter of, among other, the Swedish Pat. Nos. 205 368 and 207 918 and was described in TAPPI 53 (1970): 11, 2147.

The process implies that waste liquor from the digestion of sulphite pulps or semi-chemical sulphite pulp on sodium base is evaporated to a dry content of above about 40%. The evaporated waste liquor is subjected to heat treatment, pyrolysis, at 600° – 900°C under reducing conditions by injecting the liquor in an atomized state into a reactor, in which the liquor is mixed with oxygen-containing hot combustion gas. At the pyrolysis the dry substance is so disintegrated, that the organic substance forms both a combustible gas and a finely divided coke residue, while the anorganic substance is so disintegrated, that the main part of the sulphur of the waste liquor forms hydrogen sulphide while the main part of the sodium of the waste liquor forms solid sodium carbonate. The reaction products, thus, are a pyrolysis gas containing $H_2$, $CO$, $CO_2$, $CH_4$, $H_2S$ and $N_2$ and a dust, which contains substantially carbon and sodium carbonate. The dust-containing pyrolysis gas is cooled in a boiler whereafter the solid dust is separated in cyclones. The pyrolysis gas is directed to a gas boiler where the combustible gas is burnt to $H_2O$, $CO_2$ and $SO_2$.

The separated dust is directed to a dissolving tank where the dust is suspended in water. The anorganic residues thereby are solved in the aqueous phase whereafter the carbon is filtered off in revolving filters and sand filters.

It should be mentioned that the carbon dust obtained at the heat treatment in the reactor shows such properties that it can be defined as an active carbon.

The filtrate obtained consists of an aqueous solution containing substantially sodium carbonate and small amounts of sodium sulphide and sodium sulphate and is directed to an absorption equipment where the soda solution obtained absorbs the $SO_2$ contained in the gas from the gas boiler.

At this absorption process it was observed, that the main part of the sodium sulphide supplied with the soda solution to the absorber reacts with $SO_2$ in the flue gas and forms thiosulphate. A minor part of the sulphide, about 10% of the sulphide amount supplied, is distilled off from the solution in the form of hydrogen sulphide and escapes from the absorber with the flue gases.

Thus, at the absorption of $SO_2$ from flue gases after the gas boiler in a soda solution containing 20 g $Na_2CO_3$/litre and about 1.5 g $Na_2S$/litre, in the flue gases after the absorber a $H_2S$-content of 30 ppm $H_2S$ was obtained, which is equivalent to about 10% of the sulphide amount supplied to the absorber.

In view of the ever more increasing requirements on reduction of air pollution, such a high content of $H_2S$ in the flue gases after the scrubber probably will not be tolerated in the future. In order to eliminate this hydrogen sulphide emission it is necessary to convert the sulphide contained in the soda solution into other nonvolatile sulphur compounds, which cannot convert into hydrogen sulphide when the solution contacts flue gases containing acid gaseous substances.

At experiments with oxidation of soda solutions containing sodium sulphide by injecting atomized air, it was observed that the oxidation rate in pure solutions was such low that the method was not applicable technically.

Experiments were carried out on a laboratory scale to oxidize a soda solution from the process described containing about 20 g $Na_2CO_3$/litre and about 1.5 g $Na_2S$/litre. The soda solution was a filtrate from the revolving filter in which the soda solution is separated from the carbon residue formed at the pyrolysis. The soda solution contained about 1.5 g of active carbon per litre. The oxidizing experiment was carried out in a flask, and the air was supplied at the flask bottom and atomized by a turbine agitator with a number of revolutions such that the circumferential speed of the agitator was 2.5 m/s. The oxidation rate of the sulphide could be determined to be about 70 mg $Na_2S$/litre and minute. About 70% of the sulphide was oxidized to thiosulphate.

Corresponding oxidation experiments were then carried out with soda solution taken out before said carbon filter. At one occasion its composition was as follows:

20 g $Na_2CO_3$/litre
1.5 g $Na_2$/litre
70 g carbon/litre

Oxidation of this solution with air was studied on a laboratory scale in the same equipment and under the same conditions as described above. The oxidation rate was here measured to be 270 mg $Na_2S$/litre and hour.

About 65% of the sulphide sulphur was refound as thiosulphate in the aqueous solution. The remainder of the sulphide sulphur, about 35%, could not be found in the aqueous solution and probably was bound in some way to the active carbon.

At these experiments, thus, the unexpected results were obtained that an addition of some grams of active carbon to an alkaline sulphide solution increases the oxidation rate considerably. At an increase of the carbon addition from some grams of active carbon/litre to about 65–70 g active carbon/litre, the oxidation rate increases by a factor 3–4. According to the invention it is essential that the active carbon is introduced in finely divided form and under vigorously stirring.

It is characteristic of oxidation processes at which gaseous air is used for the oxidation of aqueous solutions, that in most cases one has to work with large air amounts and great air excesses, i.e. that the degree of utilization of the supplied air is low. This is due to the fact that oxygen is very hard to solve in aqueous solutions.

At continued oxidation experiments it was observed, that the oxidation rate was independent of the air amount down to an air amount corresponding to about twice the air amount required for oxidizing the sulphide in the solution to thiosulphate, i.e., the degree of utilization of supplied oxygen in air is of the magnitude 50%. This is a remarkably high value, as it is known that in usual cases when air is used for oxidizing substances in aqueous solutions by air injection, the utilization degree of added oxygen is of the magnitude $<1\%$ up to several percent as a maximum. This is probably due to the fact that added oxygen readily is adsorbed on the active carbon and that adsorbed oxygen then reacts with the sulphide.

The oxidation preferably is carried out in one or more reactors connected in series. For the atomization of the air, known devices can be used. One construction which was studied is a reactor type according to FIG. 1, which comprises a reactor vessel 1 divided into two chambers by partition walls 2 and provided with baffles 11. The two chambers are completely agitated by the agitators 3 and 4 driven by the agitator axle 5. Ingoing sulphide-containing soda solution with active carbon content is supplied via the pipe conduit 6 and leaves the reactor via the weir 7 and pipe conduit 8. The air required for oxidation is supplied below the agitator 3 through the pipe conduit 9 and is atomized in the agitator 3. The air leaves the lower chamber through the hole for the axle passage in the partition wall 2 and is sucked into the agitator 4. The air leaves the reactor via a suitable passage in the reactor cover 10.

At oxidizing experiments in a trial reactor according to FIG. 1 it was found, that the air amount could be reduced such that the oxygen amount supplied with the air was about equal to the stoichiometric oxygen amount required for oxidizing sulphide to thiosulphate.

At certain sulphite digesting processes, great amounts of thiosulphate in the cooking liquid are an undesired component, which can give rise to disturbances in the digesting process. Oxidation of sulphide to thiosulphate by air, however, brings about a lower thiosulphate content in the cooking liquid than oxidation of sulphide to thiosulphate by help of $SO_2$.

The present invention, thus, renders it possible in a simple and exonomic way to eliminate the hydrogen sulphur distillation at absorption of $SO_2$ in soda solution obtained by heat treatment of waste liquor at 600° – 900°C under reducing conditions in a way disclosed, for example, in the Swedish Pat. Nos. 205 368, 207 918 and TAPPI 53 (1970):1, 2147, in such a manner, that the pyrolysis gas obtained after heat treatment and heat exchange is liberated from dust consisting substantially of carbon and soda and containing small amounts of sodium etc., that the separated dust is suspended in water, the resulting carbon-soda slurry containing 1–150 g carbon/litre, suitably 10–100 g carbon/litre and preferably 40–100 g carbon/litre, and containing small amounts of $Na_2S$, is subjected to oxidation by supply of atomized air in an amount corresponding to 0.5 – 100 parts by volume/part by volume of slurry and preferably 1–10 parts by volume of air/part by volume of slurry at a temperature of between 10° –90°C, suitably 20°–90°C and preferably between 50° and 85°C, that the oxidation suitably is carried out in one or more reactors connected in series in which air is atomized in a known manner, and preferably is carried out in one or more reactors connected in series where the atomization of the air is effected by turbine agitators, and that the staying-time in the reaction vessel is 2–40 min, suitably 5–30 min, and preferably 10–25 min. In order to achieve a satisfactory contact between air bubles and carbon particles, the peripheral speed of the agitator should be 1.5–15 m/s, preferably 2.0–12 m/s.

Subsequent to completed oxidation the carbon is separated from the soda solution in a known manner. The soda solution is directed to $SO_2$-absorption while the carbon is passed to combustion.

The present invention, however, is not restricted to use at the process described, but it may be applied in general at occasions when alkaline sulphide solutions are to be oxidized and one has access to suitable active carbon or carbon with active properties. Another application field, thus, may be mentioned.

In the pulp industry, at the recovery of waste liquors from the digestion of pulp according to the sulphate method, a waste liquor is obtained which contains sulphide solved in the waste liquor. A usual way of recovering this waste liquor comprises the evaporation of the waste liquor and combustion in a so-called recovery boiler.

The evaporation generally is carried out in multistage-evaporators. In order to improve the heat economy, it is usual to distill off part of the water in the waste liquor in a final evaporation stage, which is so carried out that the waste liquor pre-concentrated in the evaporation plant is brought into direct contact with hot flue gases from the recovery boiler.

When the pre-concentrated sulphide-containing waste liquor is brought into contact with the flue gases containing acid gases such as carbon dioxide and sulphur dioxide, part of the sulphide, however, will pass over to the flue gases in the form of hydrogen sulphide and in this way give rise to an air pollution when the flue gases from the final evaporation stage are emitted into the atmosphere.

A usual way of solving this air pollution problem is to oxidize the waste liquor with air or oxygen prior to the final evaporation stage. It occurs that either the so-called release liquor prior to the multistage-evaporation is oxidized or the partially evaporated heavy black liquor.

One of the disadvantages of the aforesaid process is that the sulphate waste liquor is a highly foaming liquid, and the oxidation, therefore, normally requires extensive means to kill the foam developed at the oxidation.

By applying at this black liquor oxidation the present invention, by supplying atomized cheap active carbon or, if the recovery boiler is combined with a pyrolysis reactor where part of the heavy black liquor is pyrolized to pyrolysis gas, by supplying carbon and soda, the resulting carbon residue after leaching of anorganic salts can be transferred to the waste liquor to be oxidized by air or oxygen. Due to the fact that thereby the oxidation rate for sulphide increases at the same time as the utilization degree of added oxygen increases, the invention provided the following advantages compared with the conventional method.

The staying-time for the liquor is shorter and thereby the oxidation apparatus can be made smaller and cheaper, the necessary devices for the supply of air or oxygen can be made smaller and thereby cheaper, and as the foaming problem is smaller the means for killing developed foam can be simpler and thereby cheaper.

The oxidized waste liquor together with carbon developed therein can without further action be supplied to the final evaporation stage and thereafter be burned in the recovery boiler.

We claim:

1. A method of converting to a non-volatile reaction product comprising sodium thiosulphate the sodium sulphide content of soda solution containing finely divided active carbon obtained by recovering chemicals from waste liquor from the digestion of lignocellulosic material, in which recovery process the waste liquor is evaporated to a content of solid material of at least 40%, and thereafter is pyrolyzed at a temperature of 700°–800°C. under reducing conditions for the production of a combustible gas and a solid residue and containing active carbon from the pyrolyzing step, sodium carbonate and sodium sulphide, according to which method said solid residue is separated and dispersed in water, the dispersion is oxidized by means of an oxygen-containing gas, under stirring, the amount of active carbon in the dispersion amounting to from 1 to 150 grams of carbon per liter of solution and the gas being introduced into the body of the solution, at a locus adjacent the bottom of the body, at a temperature of 10°–90°C., the gas being maintained in intimate contact with the solution for a period of 2–40 minutes.

* * * * *